July 11, 1961

H. A. LEWIS 2,992,401

PLUG-IN BUSDUCT

Filed Nov. 6, 1957

INVENTOR:
HAROLD A. LEWIS

By Brumiga and Sutherland

ATTORNEYS.

INVENTOR:
HAROLD A. LEWIS

United States Patent Office 2,992,401
Patented July 11, 1961

2,992,401
PLUG-IN BUSDUCT
Harold A. Lewis, St. Louis, Mo., assignor to Frank Adam Electric Company, St. Louis, Mo., a corporation of Missouri
Filed Nov. 6, 1957, Ser. No. 694,813
11 Claims. (Cl. 339—22)

This invention relates generally to busduct of the plug-in type, where live bus bars are accessible to be contacted by instrumentalities or parts of the anatomy inserted from the exterior through outlet openings in the enclosure.

In plug-in busduct, openings are formed in the enclosure at selected points along the run of duct to accommodate plug-in devices. The outlets are spaced at regular intervals, for example every twelve inches, but since only certain ones are used (depending upon the desires of the user), it has been customary to provide a sliding or hinged cover plate over each outlet opening, thereby discouraging tools, fingers and the like from being inserted through such openings into accidental contact with the live bus bars. With small (thirty amps. or less per outlet) plug-in busduct, it is possible to provide a series of small apertures which will admit only the contact stabs of a small plug-in device. The apertures are of small size (one-fourth inch or less in width) and hence prevent one from inserting any part of the anatomy and also preclude the insertion of most conventional tools.

While this system is economical, it has not been practical for use with busduct of more normal capacity because the plug-in devices therefore require substantially larger openings for the contact stabs. An opening of sufficient size to admit the contact stab of a plug-in device drawing more than thirty amps. is also sufficient to admit one's finger. Consequently, cover plates have been required for each outlet on all but the small capacity plug-in busduct systems. An object of the present invention is to provide an improved outlet construction for plug-in busducts which substantially precludes the insertion of unwelcome instrumentalities or unhappy fingers, while admitting the contact stabs of the intended plug-in device.

A second problem encountered with plug-in busduct is accidental jamming of a contact stab as the plug-in device is pushed in. With the relatively large openings required for large capacity plug-in devices, care must be exercised in properly aligning the plug-in device lest one of the stabs be forced between a pair of bars and cause an improper contact or a short circuit. Accordingly, another object of the invention is to provide a plug-in outlet for busduct in which it will be all but impossible to jam or damage the contact stabs and which will therefore facilitate the plug-in operation.

In accordance with the invention generally stated, the busduct is provided with a barrier of insulating material located immediately adjacent that edge of a bus bar which is addressed toward the opening through which the plug-in device is intended to be inserted. The insulating barrier is located in alignment with the bus bar and intermediate it and the opening asociated with it, and should extend lengthwise of the bus bar for substantially the entire extent of the access opening in the lengthwise direction of the bus bar. When such an insulation barrier is so disposed, it obstructs the movement of an instrumentality or finger through the access opening. Also, the barriers function as a guide for aligning the contact stabs with the bus bars, thereby facilitating the plug-in operation and preventing a stab from being so misdirected as to short two bars. The present invention further contemplates so constricting the opening to and past the insulation barrier that the possibility of circumvention, at least by straight objects such as screw drivers, is minimized.

In the accompanying drawings:
FIGURE 1 is a view in cross-section of a length of busduct constructed in accordance with the present invention, and showing in association therewith a typical plug-in device;

Figure 1:
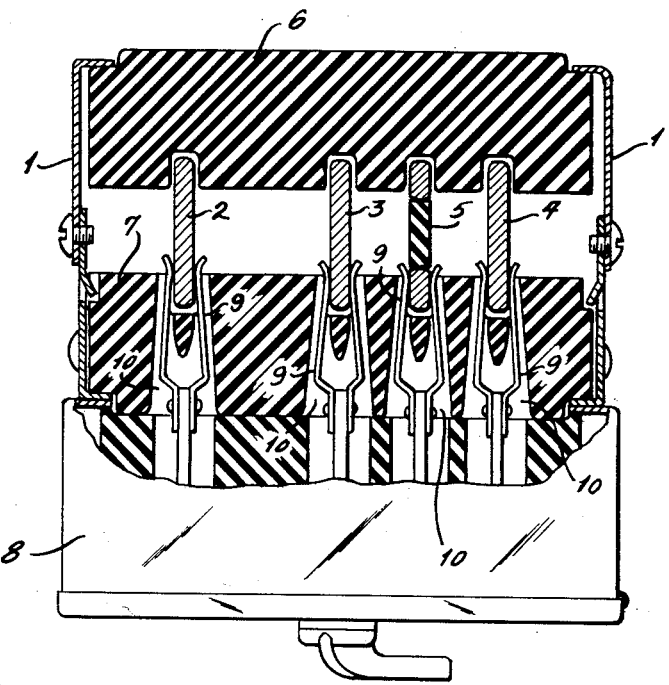

Referring now to FIGURE 1 of the drawings, the usual plug-in type busduct consists of a plurality of lengths of bus bar suitably supported on edge in parallel spaced relation within an enclosure or duct 1, part only of which is shown in FIGURE 1. Such duct is usually made in two pieces, which may be either top and bottom troughs telescoped one within the other as shown, or may be a deeper trough with a lid, or any other suitable construction, as such forms no part of the present invention. Within such a duct, a series of bus bars 2, 3, 4, and 5 may be mounted and maintained in appropriate position within the duct by suitable insulator supports 6 and 7. While the features just described are common to ordinary, as well as to plug-in, busduct, in the latter type the enclosure is provided with access openings through which contact stabs of an appropriate plug-in device may be inserted. Such a plug-in device is indicated by the numeral 8 in FIGURE 1, and consists essentially of a base and a plurality of sets of contact stabs 9, each having a pair of convergent curved resilient contacts or stabs adapted for gripping engagement on opposite sides of a bus bar.

In accordance with the present invention, the access openings, through which the plug-in contacts 9 are inserted into engagement with a bar such as 2, are formed in the insulator 7 so that the opening 10 is completely surrounded by insulation from the bottom of the duct up to and beyond the edge 11 of bus bar 2. The insulator is customarily grooved as at 12 to receive and support a bus bar, and to maintain it in proper spaced relationship from other similar bars, and, in the embodiment shown in the drawings, where the plug-in device is equipped with paired contacts, one to engage each side of the same bus bar, such a groove 12 is preferably centered with respect to access opening 10. At the exterior of the busduct, access opening 10 terminates in a mouth 13.

The present invention is characterized by the feature that between groove 12 and mouth 13, the access opening 10 is intercepted by a barrier 14 of insulating material which may be, and preferably is, an integral part of insulator 7. As shown, the barrier 14 is aligned with bus bar 2 between edge 11 thereof and mouth 13 of opening 10. The insulating barrier 14 so restricts the area of the passageways 15 on opposite sides thereof that an unwelcome instrumentality or unhappy finger is not easily inserted therethrough into contact with the bus bar, and it also facilitates alignment of the contact stab with its bus bar.

The presence of barrier 14 in access opening 10, however, does no interfere with the insertion and removal of the plug-in contacts 9, as the passageways 15 are of cross-sectional area such as to accommodate and guide the passage of the contacts past and beyond barrier 14 to the bus bar 2.

While the structure has been specifically described only with respect to bus bar 2, its environs and its companion plug-in contacts 9, it will be understood that a similar arrangement of parts occurs adjacent bus bars 3, 4 and 5, or such of them as may be desired. In this connection, it may be noted the main passages 10 can be relatively wide (for example, greater than a quarter of an inch) so as to accommodate large capacity plug-in devices, while the spaces 15 are small (for example, less than a quarter of an inch). The significance of this relationship is that it permits omission from the enclosure of sliding cover plates, which have heretofore been deemed necessary for reasons of safety.

Figure 3:
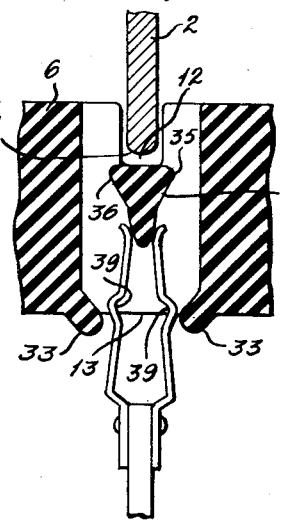
FIGURE 3 is a view corresponding to FIGURE 2, but showing a modified form of insulation barrier and plug-in device, the latter being in the process of being inserted into connection with the bus bar.

Referring now to FIGURE 3 for a further embodiment of the invention, it will be observed that the cross-sectional shape of the insulation barrier has been modified so that adjacent groove 12, a barrier 34 is provided which is, in fact, thicker than the adjacent bus bar 2. Furthermore, the mouth 13 of the access opening has been constricted by the provision of ribs 33 at each side of the path of the plug-in device. The ribs 33 are so correlated with respect to the crests 35 and 36 of barrier 34 that a straight line tangent with either of crest 35 or 36, and also tangent with the crest of the subjacent rib 33, will be so nearly parallel to the vertical (as shown in FIGURE 3) axis of bus bar 2 that it will not intersect the bus bar.

Figure 4:
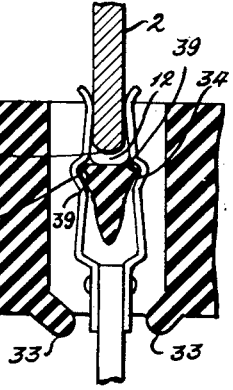
FIGURE 4 is a view corresponding with FIGURE 3, but showing the plug-in device in final connecting position with the bus bar.

In the embodiment shown in FIGURE 3, the contacts of the plug-in device are further modified to provide bulges 39 of such proportions and configuration as to receive the crest 35 or 36 of barrier 34, and permit the ends of the contacts to engage bus bar 2 once the plug-in device is in its final inserted position, as shown in FIGURE 4.

Figure 2:
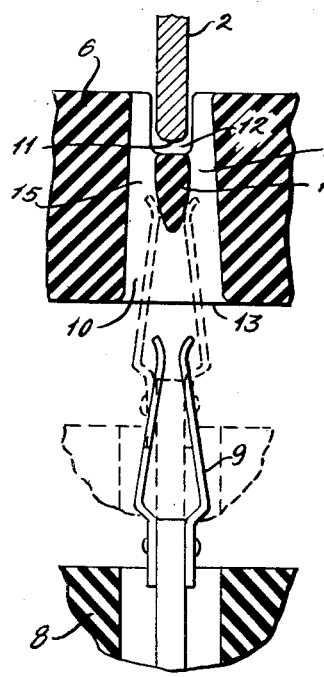
FIGURE 2 is an enlargement at the same cross-section shown in FIGURE 1, but showing the plug-in device in several positions occupied by it during the process of inserting it.
Figure 5:
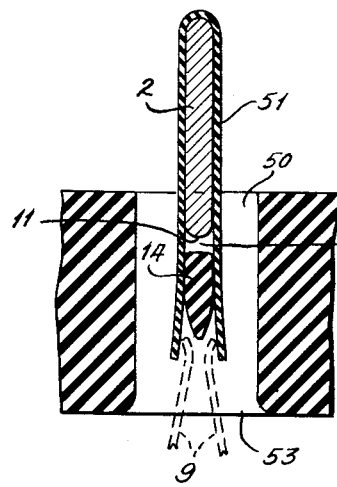
FIGURE 5 is a view corresponding in location with FIGURE 2, but showing a further modification of the invention with the plug-in device illustrated as in the process of being inserted.
Figure 6:
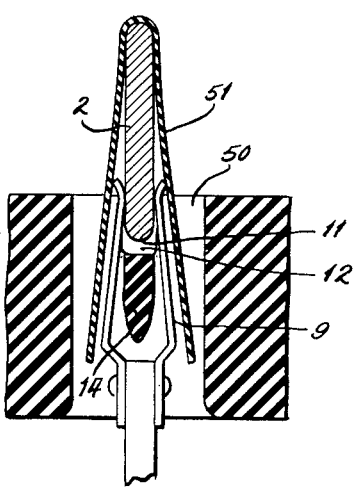
FIGURE 6 is a view corresponding with FIGURE 5, but showing the plug-in device in final connected position.
Figure 7:
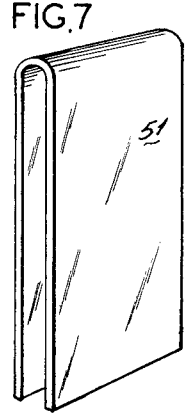
FIGURE 7 is a perspective view of an insulating member shown in association with the bus bar in FIGURES 5 and 6.

A further embodiment of the invention is shown in FIGURES 5, 6 and 7, wherein the structure is identical with the form shown in FIGURE 2, except that the access opening 50 has substantially parallel sides, and the bus bar is provided with an insulating saddle 51, the legs of which extend downwardly across barrier 14 and toward the mouth 53 of the access opening.

The insulating saddle 51 is constructed of a strip of suitable insulating material either molded to the hairpin shape shown in FIGURE 7, or folded and pre-set to that shape. The insulating material employed in saddle 51 is preferably of a resilient character such that the legs of the saddle tend always to resume the position shown in FIGURE 5, but are nevertheless spreadable when cammed apart by the insertion of contacts 9 at opposite sides of barrier 14. When in normal position, the legs of saddle 51 grip against the opposite sides of barrier 14, as shown in FIGURE 5, and thus prevent other than deliberate contact of the bus bar by an unwelcome instrumentality inserted through mouth 53. The saddle 51 is of such dimension lengthwise of the bus bar as to occupy substantially the entire cross-section (in that direction) of opening 50. When the plug-in device is inserted into final position, the parts occupy the position shown in FIGURE 6. When the plug-in device is removed, the legs of saddle 51 resume the position shown in FIGURE 5. In the event that saddle 51 be made of a material whose inherent resilience is insufficient to assure such resumption of position, suitable springs may be provided to assure it.

Figure 8:
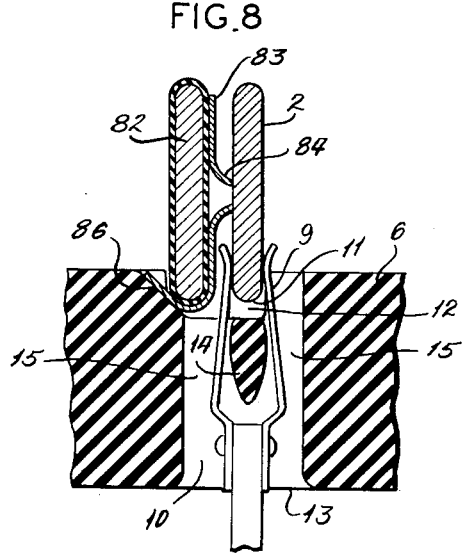
FIGURE 8 is a view corresponding in location with FIGURE 2, but showing an adaptation of the invention to multi-bar busduct, of the character having bars in pairs.

FIGURE 8 discloses an adaptation of the invention to busduct of the character wherein paired bus bars are arranged close together. For example, two bars of the same polarity may be so arranged to increase the current-carrying cross-section in A.C. or D.C. systems or they may be of different phase in A.C. systems.

Figure 9:
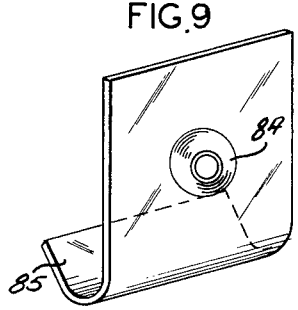
FIGURE 9 is a perspective view of an insulating member forming a part of the assembly shown in FIGURE 8.

In the latter instance, it is advisable to insulate (as by wrapped tape) at least one of the bus bars, such as 82, while the other bus bar 2 is bare, at least in the proximity of the plug-in opening, as in the previous embodiments. The insertion and removal of plug-in devices in such situations is, of course, limited to contact with the bare bus bar 2 of a given pair. In the process of inserting the plug-in devices, however, there exists the likelihood that the insulation on the exterior of bus bar 82 may be torn or worn away. Accordingly, the present invention contemplates the provision of a protective shield 83 about bus bar 82. The shield, per se, is shown clearly in FIGURE 9 and comprises a sheet of insulating material molded, or otherwise pre-set, to the form shown so as to include a button 84 positioned between bus bars 82 and 2 and holding them apart, said button, however, being well outside the path traversed by the contacts 9 of the plug-in device. At the lower edge, the shield 83 is provided with an upturned flap to embrace the lower edge of bus bar 82 and be seated upon, and held in position by engagement with, a chamfered part 86 of the insulator. If, as is preferably the case, the shield 83 be made of material which is harder than the wrapped insulation about bus bar 82, the insertion and removal of the plug-in contacts may mar the surface of the shield after repeated insertions, but will not destroy the insulation about bar 82.

From the foregoing description, those skilled in the art should readily understand that the invention accomplishes its objects, and provides a plug-in busduct structure in which the hazard of unintentional communication from the exterior with live bus bars on the interior is substantially reduced. The relationship between the barrier and passage is important in several respects. If the gaps (transverse dimensions) between the barrier and the walls of the passage is sufficiently small (one-quarter of an inch or less being recommended), the resulting degree of safety permits elimination of the cover plates heretofore required for outlet openings in plug-in busduct. Also, the passage and barrier serve to guide or align the stabs with the bus bars, thereby preventing jamming of a stab between the bars (such being disastrous) and generally facilitating the plug-in operation. While several embodiments of the invention have been disclosed herein, it is not to be understood that the invention is limited to the details of those embodiments, save as set forth in the appended claims.

Having thus described the invention, what is claimed and desired to be secured by Letters Patent is:

1. In plug-in type busduct having an elongate bus bar and an enclosure formed with an opening opposite one edge of the bus bar through which a pair of contacts of a plug-in device may be inserted into gripping engagement with opposite sides of the bus bar, the improvement that comprises a barrier of insulating material aligned with said edge of the bus bar and supported to provide clearance on opposite sides thereof for passage of the paired contacts on opposite sides of and past said barrier and into engagement with the bus bar therebeyond.

2. A plug-in busduct of the type set forth in claim 1, wherein said barrier is of generally triangular cross-section and is disposed with its base adjacent said edge of the bus bar and with its vertex toward said opening.

3. A plug-in busduct as set forth in claim 1, wherein the maximum dimension of said barrier in the direction transverse to the run of bus bars is at least as great as the thickness of said bus bar.

4. In plug-in busduct having a plurality of bus bars extending in parallel relationship, an elongate enclosure surrounding the run of bus bars, insulating supports for said bus bars extending between the sides of the enclosure and the edges of said bars to hold them in spaced relationship, and an opening formed in one side of the enclosure opposite one of said insulating supports; the improvement which comprises said insulating support being sufficient to extend entirely across said enclosure, a plurality of relatively small passages extending through said insulating support, the entrances to said passages being in spaced relationship from the opening-defining edges of the enclosure, each of the passages otherwise opening inwardly to the edge of a bus bar, and an insulating barrier mounted on said insulating support to extend across each of said passages opposite to and parallel with the edge of the adjacent bus bar, said barriers being of a transverse dimension approximately the same as the thickness of the bus bar, and said passages providing clearance on opposite sides of the barriers, thereby to permit contact stabs of a plug-in device to be moved beyond said barriers into gripping engagement with opposite sides of the bus bars, and said clearance between the barrier and the wall of the passage being substantially less than the wall to wall clearance of the passage.

5. A plug-in busduct as set forth in claim 4, wherein the clearance between the barrier and the wall of the passage is on the order of a quarter of an inch, thereby to preclude insertion of a finger.

6. Plug-in bus duct comprising a plurality of rigid bus bars, an elongate enclosure extending about the bus bars longitudinally thereof, insulators spaced from one another longitudinally of the bus duct within said enclosure and supporting said bus bars in spaced parallel relationship, said bus bars being relatively immovable within said enclosure, said bus duct being cooperable with plug-in devices having projecting stabs adapted to make contact with the bus bars and which stabs are resiliently movable in a direction transverse to said stabs, the enclosure of said bus duct having longitudinally spaced openings formed therein opposite said insulators, which openings are smaller than said insulators, but of a size such as to admit all of the stabs of the plug-in device, and said insulators having a plurality of relatively smaller passages spaced inwardly with respect to the edges of the openings in said enclosure, each of said smaller passages being of a size sufficient to admit a stab of the plug-in device and said passages being disposed adjacent the sides of the bus bars, the insulator otherwise extending over the bus bars to preclude direct access to the bus bars, thereby to permit said stabs to move into the enclosure and for transverse resilient engagement with the bus bars, the passages being otherwise of such small size as to provide a safe condition without a door or other covering over the plug-in opening of the enclosure.

7. In plug-in busduct of the type having an elongate enclosure, bus bars extending longitudinally thereof in transversely spaced relationship and an insulator secured between the bus bars and one wall of said enclosure; the improvement that comprises an opening formed in the wall of the enclosure opposite the insulator, the insulator being formed with a passage extending therethrough from said opening and adapted to admit the stab of a plug-in device inserted in a predetermined direction, said passage being entirely offset in the transverse direction from one of said bus bars but otherwise being adjacent the bus bar, whereby the insulator extends completely between the bus bar and opening of the enclosure in said predetermined direction of insertion for the plug-in device, the passage further being formed with an inclined wall portion over said bus bar, thereby to cam the end of a resilient stab in the transverse direction as it is inserted into the respective passage and then permit return movement under bias of an underhanging end portion of the stab relative to contact with the side of said bus bar after the stab end passes through said passage.

8. Plug-in busduct as set forth in claim 7, having at least two passages disposed in laterally spaced relationship each with an inclined wall portion facing in opposite directions.

9. In plug-in busduct having a plurality of bus bars and an enclosure therefor having an opening for admitting a contact stab of a plug-in device; the improvement that comprises an insulator mounted opposite said opening between the bus bars and said enclosure, said insulator being formed with a passage therethrough located generally opposite a bus bar, an insulating barrier positioned in said passage directly opposite the bus bar to obstruct said passage while providing clearence thereabout for the passage of a contact, and a second insulating barrier located adjacent said passage and forming a constriction thereof, said first and second barriers being oriented with respect to each other so that a plane tangent with the crests of said barriers does not intersect the bus bar.

10. In plug-in busduct having a plurality of bus bars and an enclosure therefor having an opening for admitting a contact stab of a plug-in device; the improvement that comprises an insulator mounted opposite said opening between the bus bars and said enclosure, said insulator being formed with a passage therethrough located generally opposite a bus bar, an insulating barrier positioned in said passage directly opposite the bus bar to obstruct said passage while providing clearance thereabout for the passage of a contact stab, and insulating means mounted on said bus bar adjacent said barrier and having a side portion thereof movable with respect to said bus bar so as to accommodate the contact stab while otherwise providing enclosing protection for the bus bar.

11. In plug-in busduct having a plurality of bus bars and an enclosure therefor having an opening for admitting a contact stab of a plug-in device; the improvement that comprises an insulator mounted opposite said opening between the bus bars and said enclosure, said insulator being formed with a passage therethrough located generally opposite a bus bar, an insulating barrier positioned in said passage directly opposite the bus bar to obstruct said passage while providing clearance thereabout for the passage of a contact, the bus bars being arranged in a pair on opposite sides of the passage and in close proximity thereto, and spacer means mounted between said bus bars adjacent said passage to maintain a clearance between the bars sufficient to admit the contact stab of a plug-in device.

References Cited in the file of this patent

UNITED STATES PATENTS

| | | |
|---|---|---|
| 1,958,539 | Hicks | May 15, 1934 |
| 1,962,554 | De Mask | June 12, 1934 |
| 1,965,087 | Sharp | July 3, 1934 |
| 1,992,816 | De Mask | Feb. 26, 1935 |
| 2,041,344 | James | May 19, 1936 |
| 2,088,105 | Frank et al. | July 27, 1937 |
| 2,312,580 | O'Brien | Mar. 2, 1943 |
| 2,318,860 | Huguelet | May 11, 1943 |
| 2,720,632 | Stieglitz | Oct. 11, 1955 |
| 2,725,541 | Born et al. | Nov. 29, 1955 |